United States Patent [19]

Carides et al.

[11] 4,194,062
[45] Mar. 18, 1980

[54] RECHARGEABLE DICHALCOGENIDE CELL

[75] Inventors: James N. Carides, Bernardsville; Donald W. Murphy, Warren, both of N.J.

[73] Assignee: Bell Telephone Laboratories, Incorporated, Murray Hill, N.J.

[21] Appl. No.: 928,529

[22] Filed: Jul. 27, 1978

[51] Int. Cl.² ............................................. H01M 6/14
[52] U.S. Cl. .................................... 429/194; 429/218
[58] Field of Search ........................ 429/194, 191, 218

[56] References Cited

U.S. PATENT DOCUMENTS 4,115,633  9/1978  Kosper et al. .................. 429/218 X

OTHER PUBLICATIONS

Science 192, pp. 1126-1127 (1976).
Materials Research Bulletin 12, pp. 825-830 (1977).
Inorganic Chemistry 15, pp. 17-21 (1976).

Primary Examiner—Charles F. LeFevour
Attorney, Agent, or Firm—Richard D. Laumann

[57] ABSTRACT

A nonaqueous secondary cell having a positive electrode and a negative electrode at least one of which contains a layered chalcogenide having the nominal atom composition $Li_yMX_2$ where M is at least one member selected from the group consisting of V and Ti, X is at least one member selected from the group consisting of S and Se and y is greater than or equal to 1.0 and less than or equal to 2.0.

13 Claims, 6 Drawing Figures

4,194,062

RECHARGEABLE DICHALCOGENIDE CELL

TECHNICAL FIELD

This invention is concerned generally with nonaqueous cells and particularly with rechargeable nonaqueous cells having electrodes containing layered dischalcogenides.

BACKGROUND OF THE INVENTION

There has been considerable interest in recent years in nonaqueous secondary cells because of the possibilities afforded both of obtaining energy densities considerably higher than those of the conventional and widely used lead acid storage batteries and of obtaining cells useful for small electronic applications, e.g., watches or calculators, that are superior to the generally used nickel-cadmium cells. Many materials have been considered as candidates for the electrode materials in nonaqueous cells.

One class of materials that has been the subject of much interest consists of the layered dichalcogenides of the transition metals of Groups IVB and VB of the periodic table. These materials are theoretically attractive electrode material candidates because a number of species, such as lithium or sodium, can move, i.e., intercalate, easily between the layers. A large number of ions of the intercalating species may often be incorporated in the layered dichalcogenide and high capacity cells result.

A large number of cells using transition metal dichalcogenides as active electrode materials have been investigated and several such cells appear promising as energy storage devices. Particularly promising are cells using $TiS_2$ or $Fe_xV_{1-x}S_2$, x greater than or equal to 0.2 and less than or equal to 0.5, as the active positive electrode material. These cells are described in *Science* 192, pp. 1126–1127, June 11, 1976 and *Materials Research Bulletin* 12, 825 (1977), respectively.

While these cells are promising, both in terms of weight and volume energy density and reversibility, improvement in some of their properties is desirable. In particular, increased capacity would be desirable. This could be accomplished by intercalating more than one ion per chalcogenide unit. However, attempts to intercalate more than one alkali metal ion per chalcogenide unit have been unsuccessful.

Additionally, the cells typically use negative electrodes containing free alkali metals, e.g., sodium or lithium. Use of such negative electrodes has several drawbacks. There are pratical problems involved both in assembling cells with free alkali metal electrodes because of both the reactivity of the alkali metal and the difficulty of controlling or minimizing dendrite growth during charging of the cell. Finally, a hazardous situation might be created if the cell structure ever became defective and free alkali metal became exposed to the external environment.

SUMMARY OF THE INVENTION

According to the present invention, a nonaqueous secondary cell uses layered dichalcogenides having the nominal atom composition $Li_yMX_2$, where M is at least one member selected from the group consisting of V and Ti; X is at least one member selected from the group consisting of S and Se and y is greater than or equal to 1.0 and less than or equal to 2.0, as electrode materials. The layered chalcogenide may be used as the active material in either the positive or the negative electrode. When the layered chalcogenide is used as the negative electrode, the positive electrode material may be a dichalcogenide having the nominal atom composition $Li_zAB_2$; A being at least one member selected from the group consisting of V, Cr and Ti; B being at least one member selected from the group consisting of S and Se; and z being less than or equal to 1.0 and greater than or equal to 0.0. When the layered chalcogenide is used as the positive electrode material, the negative electrode may be formed from a conventional alkali metal electrode.

DETAILED DESCRIPTION

Figure 1:
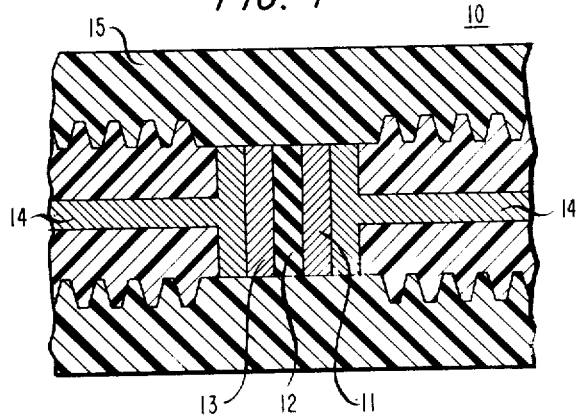
FIG. 1 is a side view of a nonaqueous cell having a negative electrode and a positive electrode.

FIG. 1 is a side view of a cell structure 10 with a negative electrode 11, a separator 12 impregnated with an electrolyte and a positive electrode 13. Also shown are current collectors 14, on both sides of the electrodes, and the surrounding structure 15 which is usually made of an inert, non-conducting material. Other cell structures, such as one having thin film electrodes, may also be constructed. A cell with thin film electrodes may be assembled in several ways. For example, the various sheets forming the electrodes and separator may be put together to form a rectangular battery or may be rolled to form a cylinder.

Nonaqueous cells using the class of lithium intercalated layered dichalcogenides represented by the nominal atom composition $Li_yMX_2$ where M is at least one member selected from the group consisting of V and Ti; X is at least one member selected from the group consisting of S and Se and y is greater than or equal to 1.0 and less than or equal to 2.0 as electrode materials are the subject of this invention. The chalcogenides may be the positive electrode material in cells using conventional alkali metal electrodes or they may be the negative electrode material in cells using layered chalcogenides represented by the nominal atom composition $Li_zAB_2$, A being at least one member selected from the group consisting of V, Cr, and Ti; B being at least one member selected from the group consisting of S and Se and z being less than or equal to 1.0 and greater than or equal to 0.0, as the active positive electrode material.

Although the compositions of both the positive and negative electrode materials are described in terms of a stiochiometric composition of M and X, this composition is only the nominal atom composition and the actual compositions used may deviate from the nominal composition by as much as plus or minus five percent from stoichiometry. Greater deviations from stoichiometry are undesirable as the intercalation process may be significantly slowed. It should also be understood that although the electrode is described as consisting of the chalcogenide, an inert material, acting generally as a binder, may also be present.

When the layered chalcogenides are used as the positive electrode material, the negative electrode may be a conventional alkali metal, e.g., lithium or sodium, electrode. When used as the active negative electrode material, the positive electrode material may be a lithium-intercalated layered dichalcogenide such as $Li_zTiS_2$; $Li_zTiSe_2$; $Li_zVS_2$; $Li_zVSe_2$; $Li_zV_{1-x}Fe_xS_2$, x greater than or equal to 0.0 and less than 0.5; or $Li_zV_{1-x}Cr_xS_2$, x greater than or euqal to 0.0 and less than 1.0; z greater than or equal to 0.0 and less than or equal to 1.0. Cells utilizing $Li_yMX_2$ negative electrodes exhibit a lower voltage than do cells using alkali metal negative electrodes but have the important advantage that they contain no free alkali metal and problems associated with poor plating efficiency of the alkali metal are avoided.

Of the $Li_2Mx_2$ compounds described, only $Li_2VSe_2$ has been prepared chemically and a method of preparation is described in *Inorganic Chemistry* 15, 17 (1976). The other $Li_2MX_2$ compounds may be prepared electrochemically in cells using the half cell reaction $Li^+ + LiMX_2 + e^- = Li_2MX_2$. The $Li_2MX_2$ compounds so formed may be used in situ or may be removed for use in other cells.

In general, cell fabrication may be carried out to yield the cell in either the charged or discharged state. One typical method of forming the cell in the charged state will be briefly outlined. The negative electrode may be formed from a mixture of the layered dichalcogenide $Li_yMX_2$, y greater than 1.0 and less than or equal to 2.0, and a material, such as polyethylene, that does not react with the electrode materials. The polyethylene acts as a binder and the binder and dichalcogenide are thoroughly mixed as by rolling on a jar mill. Other materials that are nonreactive with the electrode materials might be used. The mixture is pressed into a nonreactive metal grid such as one made of Ni, Fe, Co or Ti. The pressing should result in mechanical integrity and good electrical contacts as well as good electrical conductivity. It has been found that pressing at 130 degrees C. with a pressure of approximately 2,000 pounds per square inch or $140 \times 10^6$ dynes/cm² yields good results. The pressed material forms the negative electrode and is sandwiched between two plates forming the positive electrode. The method described may be used to form any electrode containing layered chalcogenides. The positive electrode will typically use a layered chalcogenide as the active material and is formed in the same manner as is the anode. Alternatively, the structure of FIG. 1 may be made in which case only one plate is necessary to form the anode.

The cell may be constructed in the discharged state and charged after fabrication. In this case, the negative electrode material may be $Li_yMX_2$; y greater than or equal to 1.0 and less than 2.0; and the positive electrode material may be $Li_zAB_2$; z greated than 0.0 and less than or equal to 1.0. In a preferred embodiment, y=z=1.0. Other methods of construction yielding cells in either the charged or discharged state are possible but will not be described as they will be apparent to persons skilled in the art.

The electrolyte used in the cell is conventional and any electrolyte which does not react chemically with either the negative or positive electrode materials and is sufficiently electrically conductive to permit easy migration of ions during the intercalation process may be used. Typical electrolytes include $LiPF_6$, $LiClO_4$, etc. The electrolyte may be present either in the pure state or dissolved in a suitable solvent such as propylene carbonate, ethylene carbonate, etc. Solid electrolytes such as LiI may also be used. The cell is sealed to insure isolation of the material from air after its removal from the dry box and provided with suitable electrical contacts.

The cells described in the examples used 1.0 M $LiClO_4$ in propylene carbonate as the electrolyte. The propylene carbonate (PC) was vacuum distilled from Li metal and the $LiClO_4$ was vacuum dried at 150 degrees C.

EXAMPLE 1

Figure 2:
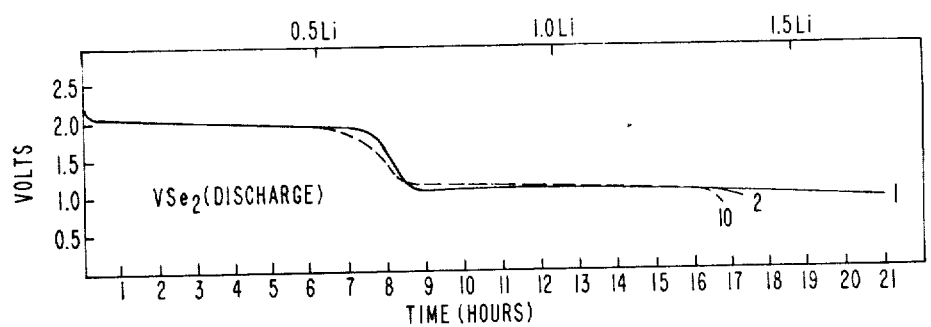
FIG. 2 shows the cell voltage, as a function of lithium content in the dichalcogenide, of a $Li/LiClO_4$, $PC/VSe_2$ cell as the cell discharges.
Figure 3:
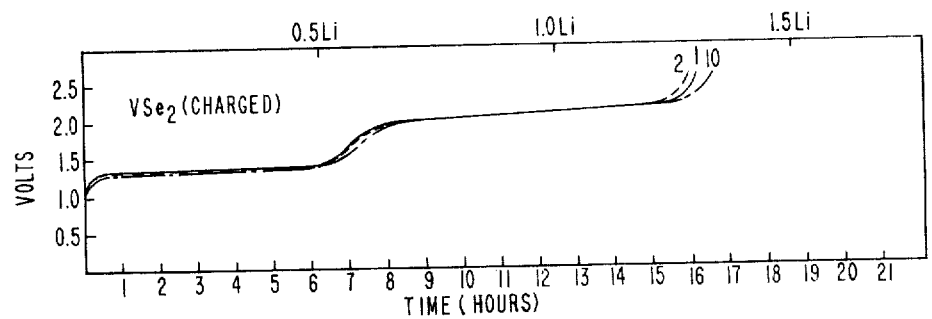
FIG. 3 shows the cell voltage, as a function of lithium content in the dichalcogenide, of a $Li/LiClO_4$, $PC/VSe_2$ cell as the cell charges.

FIGS. 2 and 3 relate, for a $VSe_2$ cell, cell voltage in volts, on the ordinate and lithium content of the $VSe_2$ and time on the abscissa during discharge and charge, respectively. The cell contained 19.3mg of $VSe_2$ and was cycled at 0.2ma. The cycle numbers are indicated on the figures. The upper voltage plateau agrees with previous data published in *Prog. in Solid State Chem.*, 17, 1 (1978). A second reversible plateau occurs near 1.1 volt versus $Li/Li^+$ with a capacity neary equal to that of the first plateau and represents a cell operating with a $Li_yVSe_2$ positive electrode and a lithium negative electrode. The constant voltage of the two plateaus suggests the hypothesis that two phase regions between $VSe_2$-$LiVSe_2$ and $LiVSe_2$-$Li_2VSe_2$ exist and this hypothesis was verified by x-ray powder data for each plateau.

EXAMPLE 2

Figure 4:
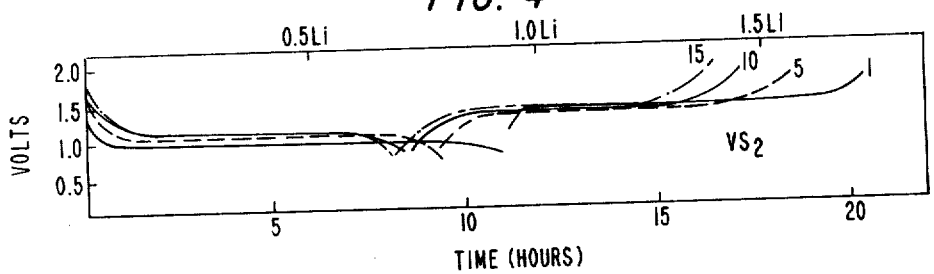
FIG. 4 shows the cell voltage, as a function of lithium content in the dichalcogenide, of a $Li/LiClO_4$, $PC/LiVS_2$ cell.

FIG. 4 relates, for a $VS_2$ cell, cell voltage in volts, on the ordinate and lithium content in the $VS_2$ and time on the abscissa for discharge and charge as indicated by the solid and dashed lines, respectively. The cycle numbers are indicated on the figures. The positive electrode of the cell contained 10.7mg of $LiVS_2$ and was cycled at 0.20ma. The negative electrode was a conventional Li electrode. The cell so constructed gave additional discharge capacity of 0.95 equivalents per V near 1.0 volt for the first discharge cycle. This declined to approximately 0.6 equivalents after 30 cycles.

EXAMPLE 3

Figure 5:
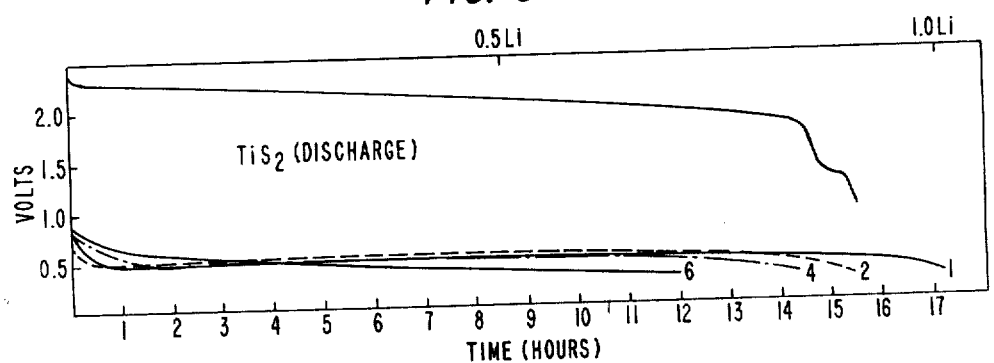
FIG. 5 shows the cell voltage, as a function of Li content in the dichalcogenide, of a $Li/LiClO_4$, $PC/TiS_2$ cell as the cell discharges.
Figure 6:
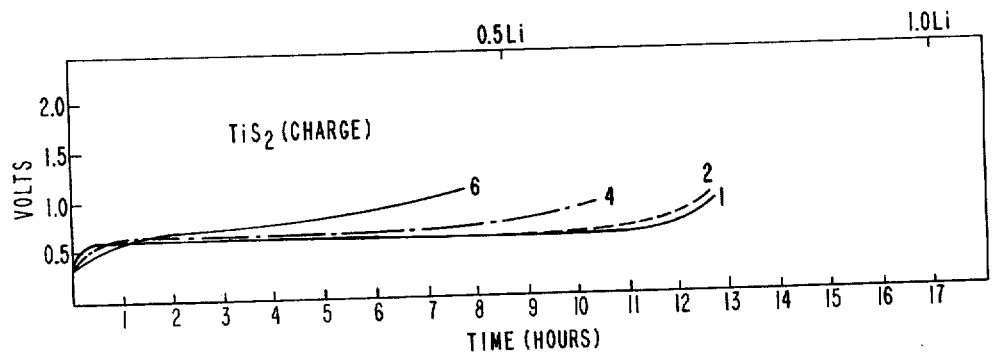
FIG. 6 shows the cell voltage, as a function of Li content in the dichalcogenide, of a $Li/LiClO_4$, $PC/TiS_2$ cell as the cell charges.

FIGS. 5 and 6 relate, for a $TiS_2$ cell, cell voltage in volts, on the ordinate and lithium content in the $TiS_2$ and time on the abscissa during charge and discharge, respectively. The cell contained 14.3 mg of $TiS_2$ and was cycled at 0.20 ma. The cycle numbers are indicated on the figures. The cell shows a low voltage plateau near 0.5 volts versus $Li/Li^+$. This plateau has a capacity that is nearly equal to one equivalent and represents a cell operating with a $Li_yTiS_2$ positive electrode and a lithium negative electrode. Cycling was poor when both plateaus were cycled but adequate reversibility was achieved when cycling was restricted to the lower plateau.

We claim:

1. A nonaqueous secondary cell comprising a negative electrode, an electrolyte, and a positive electrode, CHARACTERIZED IN THAT at least one of said negative electrode and said positive electrode consists essentially of a first layered chalcogenide having the nominal atom composition $Li_yMX_2$, where M is at least one member selected from the group consisting of V and Ti, X is at least one member selected from the group consisting of S and Se and y is greater than 1.0 and less than or equal to 2.0.

2. A cell as recited in claim 1 in which said negative electrode consists of said first layered chalcogenide; and said positive electrode consists essentially of a second layered chalcogenide having the nominal atom composition $Li_zAB_2$; A being at least one member selected from the group consisting of V, Cr and Ti; B being at least one member selected from the group consisting of S and Se; and z being greater than or equal to 0.0 and less than or equal to 1.0.

3. A cell as recited in claim 1 in which said negative electrode consists of said first layered chalcogenide; and said positive electrode consists of at least one member selected from the group consisting of $Li_zVS_2$; $Li_zVSe_2$; $Li_zTiS_2$; $Li_zTiSe_2$; $Li_zFe_xV_{1-x}S_2$, x greater than or equal to 0.0 and less than 0.5; and $Li_zCr_xV_{1-x}S_2$, x greater than or equal to 0.0 and less than 1.0; z greater than or equal to 0.0 and less than or equal to 1.0.

4. A cell as recited in claim 3 in which said first layered chalcogenide is $Li_yVSe_2$, y greater than 1.0 and less than or equal to 2.0 and said positive electrode is $Li_zVSe_2$, z greater than or equal to 0.0 and less than or equal to 1.0.

5. A cell as recited in claim 3 in which said first layered chalcogenide is $Li_yVS_2$, y greater than 1.0 and less than or equal to 2.0, and said positive electrode is $Li_zFe_xV_{1-x}S_2$, z greater than or equal to 0.0 and less than or equal to 1.0, x greater than or equal to 0.0 and less than or equal to 0.5.

6. A cell as recited in claim 5 in which x equals 0.

7. A cell as recited in claim 3 in which said first layered chalcogenide is $Li_yVS_2$, y greater than 1.0 and less than or equal to 2.0, and said positive electrode is $Li_zCr_xV_{1-x}S_2$, z greater than or equal to 0.0 and less than or equal to 1.0, x greater than or equal to 0.0 and less than 1.0.

8. A cell as recited in claim 3 in which said first layered chalcogenide is $Li_yTiS_2$, y greater than 1.0 and less than or equal to 2.0, and said positive electrode is $Li_zTiS_2$, z greater than or equal to 0.0 and less than or equal to 1.0.

9. A cell as recited in claim 1 in which said positive electrode consists of said first layered chalcogenide and said negative electrode comprises at least one member selected from the group consisting of Li and Na.

10. A cell as recited in claims 3 or 9 in which said electrolyte consists essentially of $LiClO_4$ dissolved in propylene carbonate.

11. A cell as recited in claim 9 in which said first layered chalcogenide is $Li_yVSe_2$; y greater than 1.0 and less than or equal to 2.0 and said negative electrode consists of Li.

12. A cell as recited in claim 9 in which said first layered chalcogenide is $Li_yVS_2$; y greater than 1.0 and less than or equal to 2.0 and said negative electrode consists of Li.

13. A cell as recited in claim 9 in which said first layered chalcogenide is $Li_yTiS_2$; y greater than 1.0 and less than or equal to 2.0 and said negative electrode consists of Li.

* * * * *